United States Patent [19]

Mamery

[11] Patent Number: 4,805,926
[45] Date of Patent: Feb. 21, 1989

[54] SELF-LUBRICATING DEVICE FOR COUPLING SEMITRAILERS

[76] Inventor: Gaby Mamery, F-51300 Vitry le Francois, Loisy sur Marne, France

[21] Appl. No.: 37,258
[22] PCT Filed: Jul. 11, 1986
[86] PCT No.: PCT/FR86/00250
    § 371 Date: Mar. 13, 1987
    § 102(e) Date: Mar. 13, 1987
[87] PCT Pub. No.: WO87/00495
    PCT Pub. Date: Jan. 29, 1987

[30] Foreign Application Priority Data

Jul. 15, 1985 [FR] France ................ 85 10921

[51] Int. Cl.⁴ .................................. B62D 53/08
[52] U.S. Cl. .......................... 280/433; 384/125; 384/421
[58] Field of Search ............ 280/433, 423 R, 439, 280/440, 441; 384/421, 125, 907, 908, 909

[56] References Cited

U.S. PATENT DOCUMENTS

| | | |
|---|---|---|
| 3,275,390 | 9/1966 | Franks ............ 280/433 X |
| 3,451,731 | 6/1969 | Weichsel .......... 384/125 |
| 3,704,924 | 12/1972 | Lowry ............ 280/433 X |
| 4,169,635 | 10/1979 | Szalay et al. ..... 280/433 X |
| 4,457,531 | 7/1984 | Hunger ............ 280/433 |
| 4,542,912 | 9/1985 | St. Louis ......... 280/433 |

FOREIGN PATENT DOCUMENTS

| | | |
|---|---|---|
| 0058732 | 9/1982 | European Pat. Off. . |
| 0117319 | 9/1984 | European Pat. Off. . |
| 1022475 | 1/1958 | Fed. Rep. of Germany ...... 280/433 |
| 58732 | 9/1982 | Fed. Rep. of Germany ...... 280/433 |
| 3518540 | 11/1986 | Fed. Rep. of Germany ...... 280/433 |
| 87/00495 | 1/1987 | PCT Int'l Appl. ............. 280/433 |

Primary Examiner—David M. Mitchell
Assistant Examiner—Mitchell J. Hill
Attorney, Agent, or Firm—Cushman, Darby & Cushman

[57] ABSTRACT

A removable self-lubricating plate for the coupling of semi-trailer vehicles includes an aperture having a diameter so that the plate will frictionally engage the pivot pin of a vehicle mounted on the bearing plate of the vehicle so as to pinch the base of the pivot pin and will be held in position by deformation of the self-lubricating plate under its own weight.

1 Claim, 2 Drawing Sheets

SELF-LUBRICATING DEVICE FOR COUPLING SEMITRAILERS

BACKGROUND OF THE INVENTION

1. Field of the Invention

The invention relates to a removable self-lubricating device for semi-trailer couplings, comprising a self-lubricating plate which is located between the support plate of the semi-trailer and the friction part of the fifth wheel.

2. Description of the Prior Art

On tractors and semi-trailers in particular, the fifth wheel and the coupling plate have hitherto been greased with a spatula or trowel before the semi-trailer is coupled. During coupling, the grease flowed on either side of the fifth wheel, resulting in a loss of grease, a poor distribution of the grease which remained and, consequently, non-uniform and rather short-lived lubrication.

This lubrication deficiency, which hindered the free rotation of the plate relative to the fifth wheel, resulted indirectly in premature wear of the two steering pivots and of the tires and the bushes of the front springs of the tractor. This seizing also caused control problems when turning the steering wheel (oversteering).

A variety of solutions have been developed to remedy this situation by eliminating the problem of lubrication, among which there may be mentioned those described in the following patents:

EPA No. 0058732, which relates to a semi-trailer coupling comprising a fifth wheel covered with a layer of self-lubricating material, a coupling plate with a superfinished surface condition, and an intermediate steel sheet; and EPA No. 0117319, which relates to a semi-trailer coupling whose fifth wheel is provided, over its entire surface, with a self-lubricating plate fixed by means of screws, the edges of which are protected on the back by a separate metal reinforcement.

However, the self-lubricating devices referred to above have the disadvantage that the work required to construct them is rather difficult and calls for tools and know-how which transport firms does not by (sic) usually have at their disposal.

SUMMARY OF THE INVENTION

The object of the present invention is to overcome these disadvantages. This invention, as characterized (sic) in the claims, solves the problem of creating a self-lubricating device for coupling semi-trailers which can easily be fitted to the existing couplings.

The main features of this invention are that the self-lubricating plate is completed by the deposition of a self-lubricating plastic into the hollow of the horseshoe-shaped wearing part fitted in the bottom of the notch in the fifth wheel, and that the self-lubricating plate is held in position against the support plate of the semi-trailer by the pinching of the base of the pivot under the effect of the curvature due to deformation under its own weight, by means of plastic pins with countersunk heads, which are force-fitted into orifices made, as required, in the support plate, . . . (sic) by means of screws located beyond the support plate, or by flush fitting, as elements, in suitably shaped cavities arranged in the bearing face of the fifth wheel.

The advantages gained by virtue of this invention consist essentially of the fact that the device is especially suitable for direct mounting on the couplings without the latter being converted beforehand, totally eliminating lubrication problems.

BRIEF DESCRIPTION OF THE DRAWINGS

The invention is described in detail below with the aid of drawings showing different embodiments of the invention, which are given by way of non-limiting example (sic); in these drawings.

DESCRIPTION OF THE PREFERRED EMBODIMENTS

Figure 1:
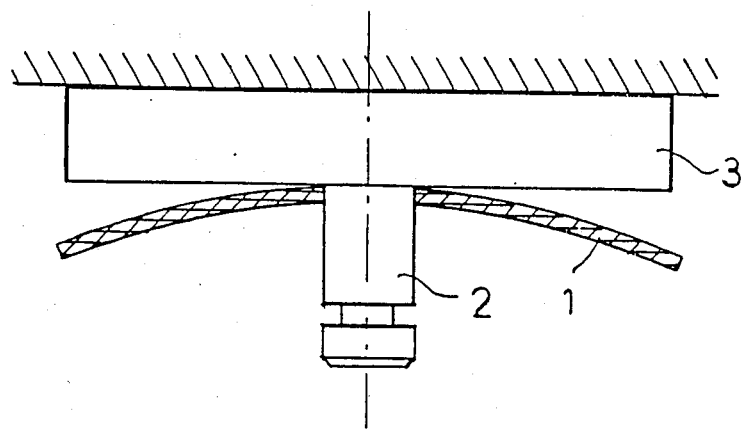
FIG. 1 shows a view in cross-section of a self-lubricating plate mounted on the base of the pivot of the support plate.

On examining FIG. 1, it is seen that the self-lubricating plate 1 adopts a curved shape through deformation due to its own weigh; this has the effect of immobilizing it by pinching on the base of the pivot 2 against the support plate 3. It then remains to pivot this plate in a direction which favors its insertion between the support plate and the fifth wheel when the semi-trailer is coupled to the tractor.

Figure 2:
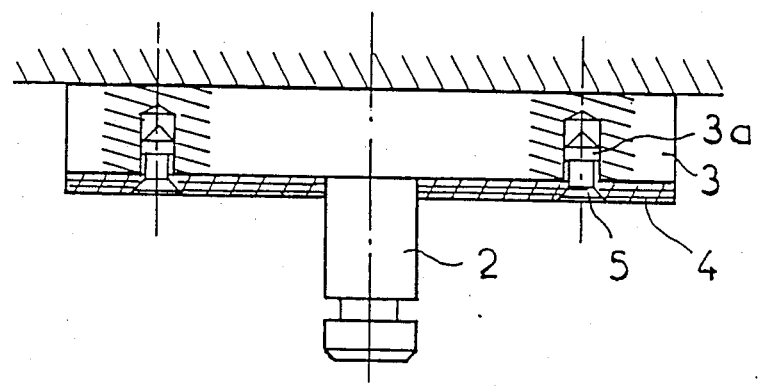
FIG. 2 shows a view in cross-section of a self-lubricating plate fixed by means of pins underneath the support plate.

On examining FIG. 2, it is seen that, in this embodiment, the self-lubricating plate 4 is fixed against the support plate 3 by means of pins with countersunk heads, 5, made of self-lubricating plastic, which are force-fitted into orifices 3a made, as required, in the support plate 3. The pins 5 made of self-lubricating plastic are fitted into the orifices made in the plate 3.

In a simplified embodiment of the device according to the invention, the self-lubricating plate 4 overhangs the support plate 3 and is fixed by means of ordinary screws located beyond the working surface of the said support plate.

Figure 3:
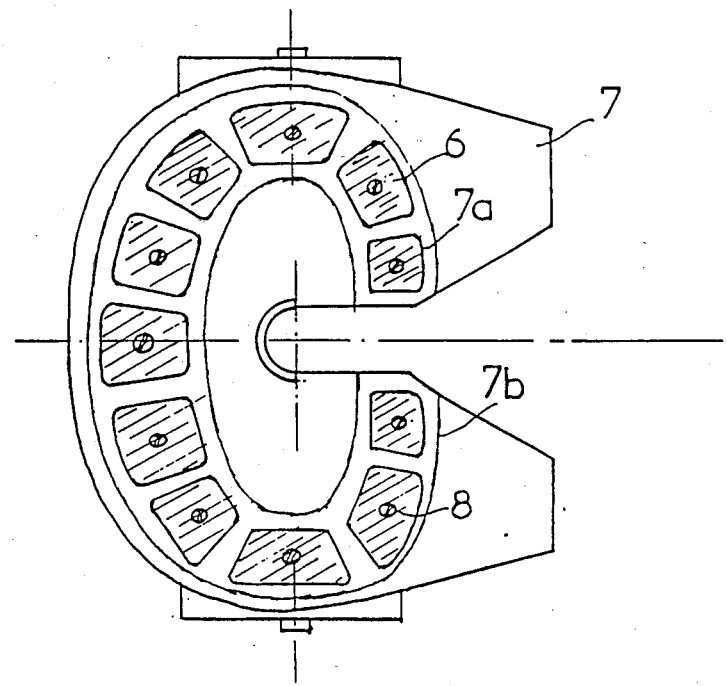
FIG. 3 shows a top view of a fifth wheel equipped with a self-lubricating plate divided up into elements inserted in the floating (sic) part of the fifth wheel.
Figure 4:
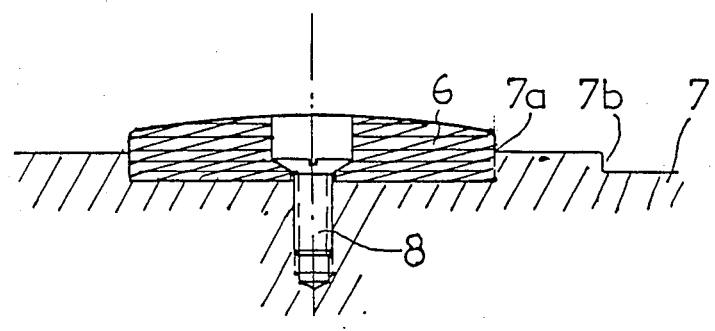
FIG. 4 shows a view in partial longitudinal section of a fifth wheel, illustrating the detail of the method for inserting and fixing the self-lubricating elements shown in FIG. 3.

On examining FIGS. 3 and 4, it is seen that, if the self-lubricating plate is divided up into elements 6, these are inserted into the cavities 7a arranged in the bearing face 7b of the fifth wheel 7, and are then firmly fixed by means of screws 8 with countersunk heads at a depth such that the said screws are not flush with the friction surface 7b of the fifth wheel in the event of extreme wear of the elements 6, which extend about 5 to 6 mm beyond the friction plane of the part 7b of the fifth wheel.

As can be seen, when the self-lubricating elements 6 have reached a certain degree of wear, it will be easy to replace them by removing the screws with countersunk heads, 8.

In a simplified embodiment, the self-lubricating elements 6 are firmly fixed to the fifth wheel 7 by being force-fitted into the cavities 7a. When they have become worn, they must be removed with the aid of a heat source.

What is claimed is:

1. A removable self-lubricating device for the coupling of semi-trailer vehicles having a bearing plate on the semi-trailer vehicle and a fifth wheel on the tractor vehicle, comprising a self-lubricating plate disposed between said bearing plate of the semi-trailer vehicle and said first wheel, said bearing plate including a pivot pin having a base, wherein said self-lubricating plate includes means defining an aperture which is slid onto said pivot pin, and is held in position against said bearing plate by action of said means defining said aperture pinching said pivot pin adjacent said base of said pivot pin under the effect of the curvature of said self-lubricating plate under its own weight.

* * * * *